April 16, 1968        W. M. PERRY        3,378,139
CULLER AND FEED MECHANISM FOR SPHERICAL OBJECTS
Filed Jan. 3, 1966
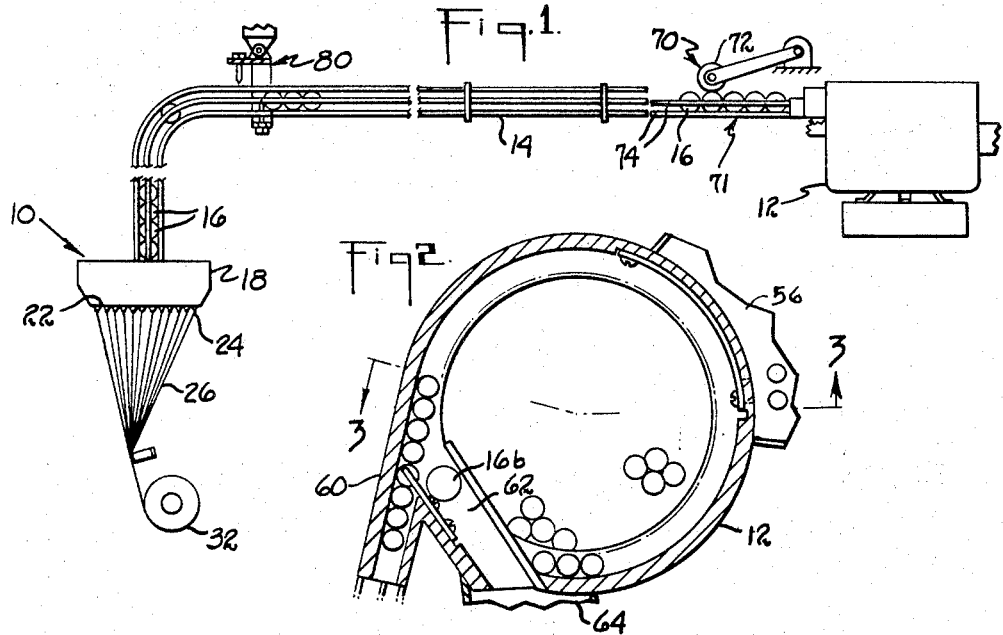
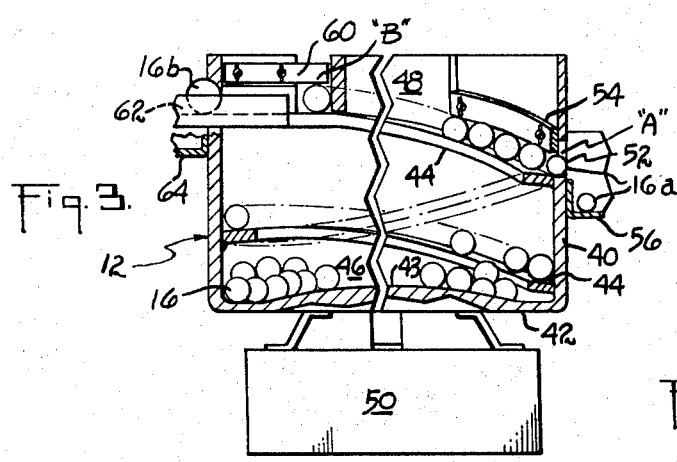
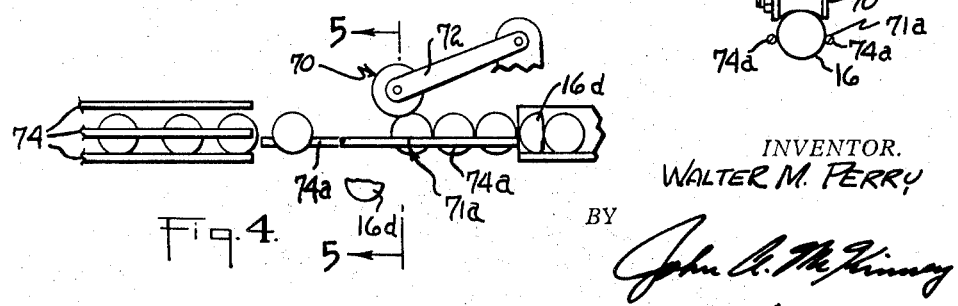
INVENTOR.
WALTER M. PERRY
BY
ATTORNEY United States Patent Office 3,378,139
Patented Apr. 16, 1968

3,378,139
CULLER AND FEED MECHANISM FOR
SPHERICAL OBJECTS
Walter Merton Perry, Darien, Conn., assignor to Johns-Manville Corporation, New York, N.Y., a corporation of New York
Filed Jan. 3, 1966, Ser. No. 518,338
6 Claims. (Cl. 209—73)

ABSTRACT OF THE DISCLOSURE

A culling and feeding mechanism for feeding spherical objects, particularly to a work processing station, such as culling and feeding glass marbles of a preselected size to a glass melting bushing.

The invention relates broadly to a novel feed mechanism for feeding spherical objects from a supply source to a station for processing. More specificaly it relates to a mechanism for culling glass marbles prior to being fed to a glass melting receptacle.

In order to form filaments and fibers of glass, it is customary to establish a supply of molten glass in a glass melting receptacle or crucible and to exude the molten glass through orifices in the base of the crucible. Filaments are drawn from the exudations at the orifice exits by mechanical means and/or a fluid blast. It is the practice to carefully meter the required number of marbles into the melting crucible, usually at regularly timed intervals synchronized to replace the volume of molten glass exuded, and preferably in a manner so as not to unduly upset the temperature conditions existing in the crucible. Thus is is preferable to add only a small amount of glass at one time—a marble of a preselected size. To promote the feeding only of marbles which are of the preselected size it is necessary to provide means for grading and culling the marbles just prior to being fed into the melting crucible. During the formation of and further handling of glass marbles, some are improperly formed and others are broken. Delivery of defective marbles or of fragments to the melting crucible would disrupt the equilibrium of the glass within the crucible.

It has been the custom in the art to provide a marble supply hopper from which the marbles are transferred downwardly and in massed and haphazard array to a feed tube having an opening which serves as a meter to exclude oversized marbles but does not exclude undersized marbles. Open grid means are usually provided as an attempt to exclude fragments. However, in respect to the fragments that approach the size of a full marble such grid means are not entirely successful.

It is an object of this invention to provide method and apparatus for delivering glass marbles of a definite preselected size to a glass melting crucible and to divert oversized, undersized and fragmentary glass marbles.

It is a particular object of this invention to provide method and apparatus for culling glass marbles when they are arranged in single file array.

It is a further object of this invention to provide a simple and facile mechanism for feeding and culling spherical objects.

Briefly, the above objects are obtained by providing a vibratory bowl type feeder with first port and discharge means for diverting undersized and fragmentary spheres as the spheres being culled are advanced in an ascending path in single columnar or row fashion, by providing second port and discharge means for admitting spheres of a desired preselected size and which divert oversized spheres, and by providing pressure and retention means for temporarily restraining the advancement of the row while a single marble or fragment is further advanced through grid means.

The invention will be more fully understood and further objects and advantages thereof will become more apparent when reference is made to the following description of species thereof taken in conjunction with the accompanying drawing wherein:

FIG. 1 is a schematic elevational view of glass making apparatus incorporating the culler and feed mechanism of this invention;

FIG. 2 is an enlarged plan view of the feed hopper shown in FIG. 1;

FIG. 3 is a cross-sectional elevational view taken along line 3—3 of FIG. 2;

FIG. 4 is an elevational view of an alternate grid system; and

FIG. 5 is a transverse view taken along line 5—5 of FIG. 4.

Referring to FIG. 1 of the drawing, there is schematically illustrated glass fiber making apparatus designated generally by the numeral 10. The apparatus 10 includes a marble supply hopper 12, a feed conduit 14 terminating to discharge marbles 16 to glass melting crucible 18. Molten glass exudes through orifices in the base 22 of crucible 18 to form exudations 24 from which primary filaments 26 are drawn. The primary filaments 26 may be attenuated by suitable means such as winding spindle 32.

As may be observed readily in FIG. 3, the marble supply hopper 12 comprises a circular wall 40 and a base 42. The circular wall 40 includes a ramp portion 44 which makes a helical path from the bottom or lower portion 46 to the top or upper portion 48. The internal surface 43 of base 42 is preferably slightly inclined downwardly and outwardly from the center of the hopper 12 to facilitate migration of marbles 16 toward the ramp portion 44.

The hopper 12 is operatively connected to electromagnetic vibratory means 50 that sets up a flow pattern of powerful pulsating vibrations causing marbles 16 to climb the ramp 44. The combination of the circular hopper 12 and the vibratory means 50 may be aptly described as a bowl type vibratory feeder but which has been modified to provide certain features hereinafter described.

The ramp 44 provides a track for guiding the marbles 16 in singular row array as they ascend the hopper 12. Adjacent to a ramp 44, an opening 52 is provided in the wall 40 for discharging and diverting undersized marbles designated by the reference manual 16a. An adjustable but securable gate 54 provides means for selectively sizing the undersize diverting port means A, for example, if ¾" diameter marbles are being processed and it is desired to exclude marbles having a diameter of less than 11/16", the gate 54 is dropped and secured to provide a port A having a height of 11/16". As the undersized marbles 16 pass adjacent to the opening 52, the vibration of the hopper 12 will cause the marbles to migrate toward the wall 40 and discharge through the opening 52. Discharge of the undersized marbles 16 may be facilitated by sloping the ramp 44 slightly downwardly toward the wall 40. The length of the opening 52 is sufficient to provide ample opportunity for the undersized marbles 16a to be discharged. A suitable container 56 may be provided to catch the undersized marbles 16a after discharge through port A and the opening 52.

Means are also provided along the path of the advancing marbles, preferably at or near the exit from the hopper 12, to restrain, divert and reject oversized marbles designated by the reference numeral 16b. Such means is illustrated to be in the form of gate 60 and spur track 62. The gate 60 is also adjustably but securably supported to provide means for selectively sizing the oversize restraining port means B, for example, if ¾" diameter marbles are being processed and it is desired to exclude marbles having a diameter greater than 13/16", then the gate 60 is secured to provide an opening having a height of 13/16". The gate 60 is also preferably supported for vibratory movement, either by connecting to hopper 12, or by connecting to separate vibration imparting means. Vibration of gate 60 frees any markbles of "borderline" size which might otherwise tend to stick or jam between the gates 60 and the track beneath the gate. A container 64 may be provided to collect the rejected oversize marbles 16b as they pass from spur track 62.

Occasionally a fragmentary marble, half or greater, but having a diameter of the preselected size, may pass through the oversize port means B. To further deter the possibility of such fragmentary marbles from passing to the melting crucible, reject means, generally designated by the numeral 70, is provided along the delivery path of the marbles. The specific reject means shown is in the form of a pivotally mounted roller 72 which serves to momentarily hold the row of marbles and relieve the pressure created by the weight of several marbles in a row bearing on an individual marble as it leaves the roller 72. Consequently, when a fragmentary marble, such as that designated as 16d passes the roller 72, it is more likely to fall down through the cullender grid 71 formed by the open arrangement of the rails 74, which together with the ramp 44, define the delivery path of the marbles. Also, the roller 72, by virtue of its imparting slight resistance to the individual marbles as they come into contact with the roller 72, will tend to reposition fragmentary marbles 16e within the guide rails 74 and thus increase the possibility of such marbles being rejected. Preferably, the roller 72 or the portion of the guide rails 74 adjacent thereto are connected for vibratory movement, as by connecting to the vibratory hopper 12, to overcome any tendency for the roller 72 to hold the row of marbles for an undue time.

To further facilitate the rejection of fragmentary marbles 16d that may pass through port B, the grid 71 may be modified to provide a two rail grid 71a as shown in FIG. 4. The pair of rails 74a are laterally spaced to define a space therebetween which is slightly less than the diameter of the marbles 16 being processed. For example, if 3/4" marbles are being processed the lateral spacing between the rails may be 11/16".

Additionally, escapement mechanism 80 may be incorporated in the delivery path of the marbles to control the rate of feed to the melting crucible. Such mechanism may be of the form shown in FIG. 4 of U.S. Patent 2,482,071 to A. L. Simison.

What I claim is:

1. Marble feeding apparatus adapted to feed glass marbles of a preselected size to a melting crucible provided with a plurality of apertures in its base for exuding molten glass, which comprises:
   (a) a supply of glass marbles;
   (b) means for forming a marble supply hopper having inclined passage means for transferring marbles from a lower portion of said hopper to an upper portion thereof;
   (c) vibratory means for agitating said marbles and causing them to move up said passage means;
   (d) first port means adjacent to and in communication with said passage means for culling glass particles of a smaller size than said preselected size;
   (e) second port means along said passage means and in communication therewith for culling glass particles of a greater size than said preselected size;
   (f) means for diverting the glass particles of said greater size from further passage along said passage means; and
   (g) cullender means along said passage means, including pressure applying means, for culling glass marble fragments that have by-passed said first port means and passed through said second port means.

2. A culler and feed mechanism for feeding spherical objects of a preselected size, which comprises:
   (a) track means defining a path along which the spherical objects may be advanced in single row fashion and including an ascending ramp portion;
   (b) vibratory means to impart vibratory movement to said ramp portion and to cause said spherical objects to ascend said ramp;
   (c) escapement port means along said path to discharge fragments or spherical objects of a size less than said preselected size;
   (d) restraining port means for restraining spherical objects along said path having a size greater than said preselected size from further advancement along said path; and
   (e) diverting means for diverting the restrained objects from said path in order to permit other of said objects to be advanced to said restraining port means.

3. Mechanism as described in claim 2, wherein: said diverting means includes a spur track section leading away from said restraining port.

4. A culler and feed mechanism for feeding spherical objects of a preselected size, which comprises:
   (a) track means defining a path along which the spherical objects may be advanced in single row fashion and including an ascending ramp portion;
   (b) vibratory means to impart vibratory movement to said ramp portion and to cause said spherical objects to ascend said ramp;
   (c) escapement port means along said path to discharge fragments or spherical objects of a size less than said preselected size;
   (d) restraining port means for restraining spherical objects along said path having a size greater than said preselected size from further advancement along said path; and
   (e) cullender means along said path, including pressure applying means applying slight pressure to said objects as they pass along said cullender means, for culling fragments of said objects.

5. A culler and feed mechanism for feeding spherical objects of a preselected size along a path, which mechanism comprises:
   (a) a hopper for containing a supply of said objects to be screened and including ramp means for advancing said objects along a helical portion of said path from a lower portion of said hopper to an upper portion thereof;
   (b) vibratory means for vibrating said hopper and agitating said objects to cause them to ascend said ramp means;
   (c) escapement port means along said ramp through which undersized or fragments of said objects are discharged from said ramp means; and
   (d) restraining port means bridging said path at a point where said path leaves said hopper, said restraining port means being adapted to restrain objects of a size greater than said preselected size from further advancement along said path.

6. Mechanism as described in claim 5, which further comprises:
   diverting means for diverting the restrained marbles from said path and out of said hopper.

References Cited
UNITED STATES PATENTS

| 1,166,537 | 1/1916 | Neal | 209—99 |
| 1,366,130 | 1/1921 | Mueller | 209—99 |
| 2,891,668 | 6/1959 | Hunt | 198—220 |

FOREIGN PATENTS

| 123,719 | 9/1959 | U.S.S.R. | |

ALLEN N. KNOWLES, *Primary Examiner.*